United States Patent [19]
Morinaga

[11] Patent Number: 5,481,277
[45] Date of Patent: Jan. 2, 1996

[54] CHARACTER GENERATOR

[75] Inventor: Hidehiko Morinaga, Tokyo, Japan

[73] Assignee: Canon Kabushiki Kaisha, Tokyo, Japan

[21] Appl. No.: 970,224

[22] Filed: Nov. 2, 1992

Related U.S. Application Data

[63] Continuation of Ser. No. 547,849, Jul. 3, 1990, abandoned.

[30] Foreign Application Priority Data

Jul. 5, 1989 [JP] Japan ................................. 1-171880

[51] Int. Cl.⁶ ..................................................... G09G 5/22
[52] U.S. Cl. ........................... 345/143; 345/195; 382/187
[58] Field of Search ................................... 340/735, 748, 340/799, 798; 178/18, 19; 382/13, 3; 395/150, 151; 345/143, 142, 141, 144, 198, 194, 195

[56] References Cited

U.S. PATENT DOCUMENTS 4,764,972  8/1988  Yoshida et al. ........................... 382/13
4,843,593  6/1989  Yanaru et al. ........................... 340/735

*Primary Examiner*—Tommy P. Chin
*Assistant Examiner*—Doon Chow
*Attorney, Agent, or Firm*—Fitzpatrick, Cella, Harper & Scinto

[57] ABSTRACT

A character generator includes a memory for storing a plurality of character patterns for each character having a specified character code, the plurality of character patterns having different writing start and end points so as to continuously couple a character pattern to the preceding and following character patterns in a string of continuous characters when the string of continuous characters are outputted, and a search unit for searching and deriving a character pattern corresponding to a subject character code from the plurality of character patterns which character pattern as derived is a most appropriate pattern and is continuously coupled to the preceding and following character patterns.

19 Claims, 10 Drawing Sheets

(A)(B)(C)----START POINT FOR
THE NEXT CHR

| START\END | a | b | c | d |
|---|---|---|---|---|
| A | — | Ab | Ac | Ad |
| B | — | Bb | Bc | Bd |
| C | — | — | — | — |
| D | — | Db | Dc | Dd |

| START \ END | a | b | c | d |
|---|---|---|---|---|
| A | — | — | — | — |
| B | — | — | Bc | Bd |
| C | — | — | — | — |
| D | — | — | Dc | Dd |

FIG. 5-3

"shi"

| START \ END | a | b | c | d |
|---|---|---|---|---|
| A | Aa | Ab | Ac | Ad |
| B | Ba | Bb | Bc | Bd |
| C | Ca | Cb | Cc | Cd |
| D | Da | Db | Dc | Dd |

FIG. 8
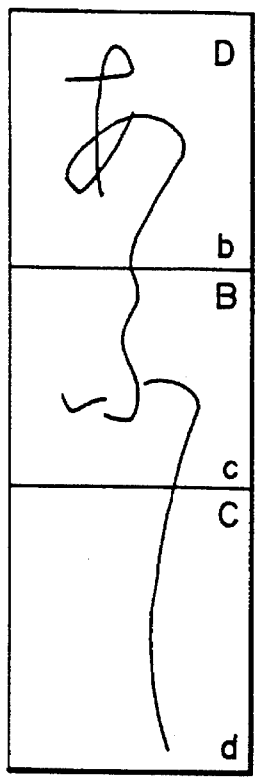
FIG. 9
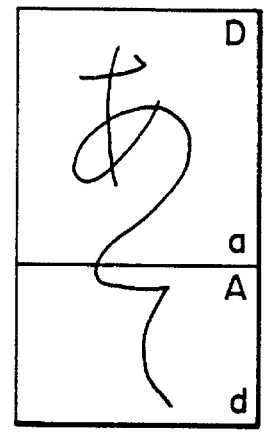
FIG. 10
| AR (n) | 1 | 2 | 3 |
|---|---|---|---|
| あ (a) | A | B | NONE |
| ふ (fu) | B | NONE | NONE |
| し (shi) | B | C | A |

5,481,277

CHARACTER GENERATOR

This application is a continuation of application Ser. No. 07/547,849 filed Jul. 3, 1990, abandoned.

BACKGROUND OF THE INVENTION

1. Field of the Invention

The present invention relates to a character generator for generating a character pattern corresponding to an inputted character code, and more particularly to a character generator suitable for generating a character pattern in continuous script.

2. Related Background Art

In a conventional character generator, character patterns are stored in a read-only memory (ROM) at addresses assigned to respective character codes. Upon input of a character code, a corresponding character pattern is read out from ROM at a designated address.

A conventional character generator stores in ROM a single type of a character pattern for each character. Therefore, it is not possible to generate and select a variety of character patterns matching their succeeding and following character patterns for character pattern in continuous script, such as "か" ("a") as shown in FIGS. 8 or 9.

SUMMARY OF THE INVENTION

In view of the above circumstances, it is an object of this invention to provide a character generator capable of solving the above problem and generating a character pattern used in continuous script.

It is another object of this invention to provide a character generator comprising storage means for storing a plurality of continuous-script character patterns for each character having a specified character code, the plurality of character patterns having different writing start and end points so as to continuously couple a character pattern to the preceding and following character patterns when the character patterns are outputted; and searching means for searching and deriving a character pattern corresponding to a subject character code from the plurality of character patterns which character pattern as derived is a most appropriate pattern and is continuously coupled to the preceding and following character patterns.

It is still another object of this invention, to provide a character generator in which, searching means searches and derives a combination of character patterns corresponding to a subject character code and codes of the preceding and following characters from the plurality of character patterns stored in a storage means, which combination as derived is a most suitable combination and the character patterns are continuously coupled to each other, and therefore, a combination of character patterns in continuous script becomes most appropriate.

BRIEF DESCRIPTION OF THE DRAWINGS

FIGS. 5-1 to 5-3 are tables showing the contents of a directory area according to an embodiment of this invention;

FIGS. 7 and 7A–7B are flow charts showing the control procedure executed by CPU according to an embodiment of this invention;

FIGS. 8 and 9 are diagrams illustrating examples of a string of character patterns in continuous script according to an embodiment of this invention;

FIG. 10 shows the contents of AR information according to an embodiment of this invention.

DETAILED DESCRIPTION OF THE PREFERRED EMBODIMENTS

The embodiments of this invention will be described in detail with reference to the accompanying drawings.

Figure 1:
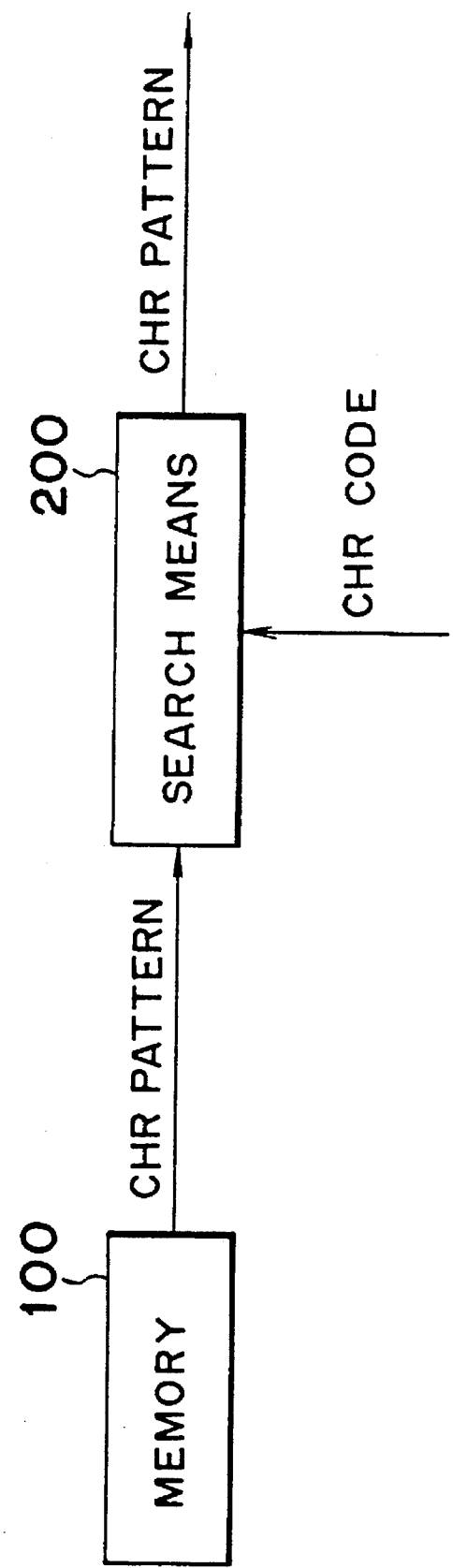
FIG. 1 is a block diagram showing the fundamental structure of an embodiment according to this invention.

FIG. 1 shows the fundamental structure of an embodiment of this invention.

Referring to FIG. 1, reference numeral 100 denotes storage means for storing a plurality of continuous-script character patterns for each character having a specified character code. The plurality of character patterns have different writing start and end points so as to continuously couple a character pattern to the preceding and following character patterns in continuous script when these characters are outputted.

Reference numeral 200 denotes searching means for searching and deriving a character pattern corresponding to a subject character code from the plurality of character patterns which character pattern as derived is a most appropriate pattern and is continuously coupled to the preceding and following character patterns.

The embodiments of this invention will be described taking Japanese characters as an example. However, it is to be noted that the invention is not limited thereto.

Figure 2:
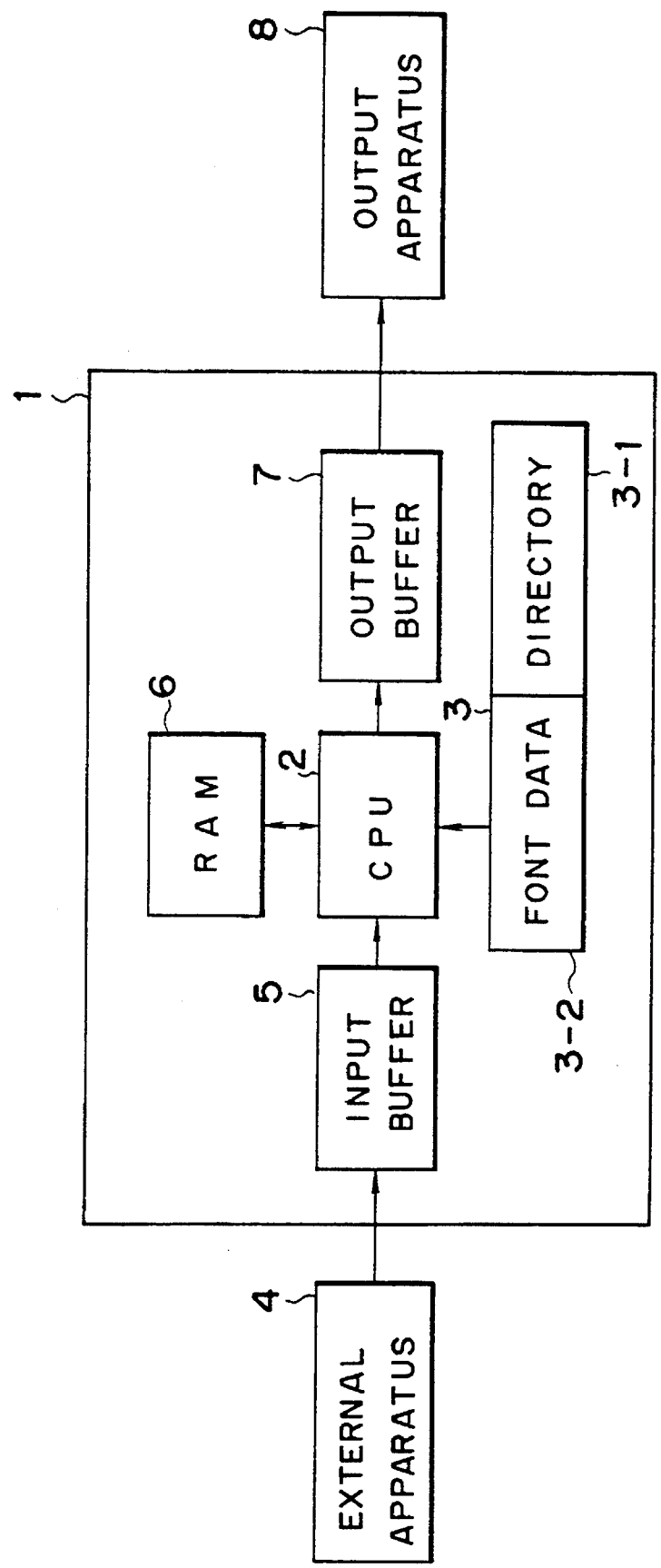
FIG. 2 is a block diagram showing the circuit structure according to an embodiment of this invention.
Figure 6:
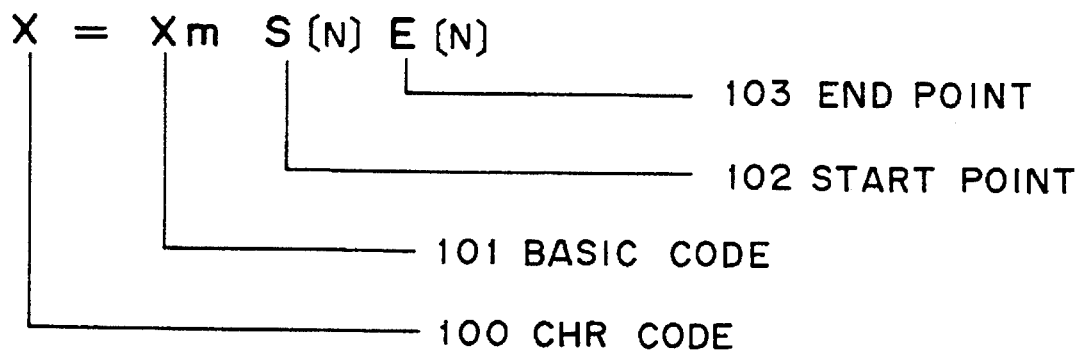
FIG. 6 is a format of a character code X according to an embodiment of this invention.

FIG. 2 shows the particular circuit structure of the embodiment of this invention. Reference numeral 1 denotes a character generator for generating a font pattern of a character image to be printed or displayed. Reference numeral 2 denotes a central processing unit (CPU) which controls the operation of generating a character. In this embodiment, CPU 2 executes the control procedure shown in FIG. 6 and generates character patterns in continuous script.

A read-only memory (ROM) 3 has a directory area 3-1 and font data area 3-2. In the font area 3-2, there are stored a plurality of continuous-script character patterns for each character, the plurality of character patterns having different writing start and end points so as to continuously couple the start and end lines of a character pattern to the preceding and following character patterns in continuous script when these characters are outputted. In the directory area 3-1, there are stored writing start and end points for respective character patterns and optimum combinations of continuous-script character patterns for characters to be coupled to each other. As font data used for forming a character pattern, various types of fonts may be used, such as dot fonts forming a character on the dot unit basis, and outline fonts forming a character by line segments represented by coordinate values. An external apparatus 4 such as a host computer outputs a character code of a character to be generated. An input buffer 5 temporarily stores data input from the external apparatus 4. Another buffer 6 constructed of a random access memory (RAM) temporarily stores data obtained in the midst of processing by CPU 2. An output buffer 7 temporarily stores font final data processed by CPU 2. An output apparatus 8 displays or prints a character image in accordance with font data outputted from the output buffer 7.

Next, the principle of continuity between characters will be described with reference to FIGS. 3 and 4.

For each continuous-script character pattern specific writing start and end points are previously determined. In this embodiment, as shown in FIG. 3, the writing start points are defined as A at the upper leftmost of a character, B at the upper center, C at the upper rightmost, and D for the case in which the character is not continuous from the preceding character. The writing end points are defined as a at the lower leftmost of a character, b at the lower center, c at the lower rightmost, and d for the case in which the character is not continuous with the following character.

Figure 3:
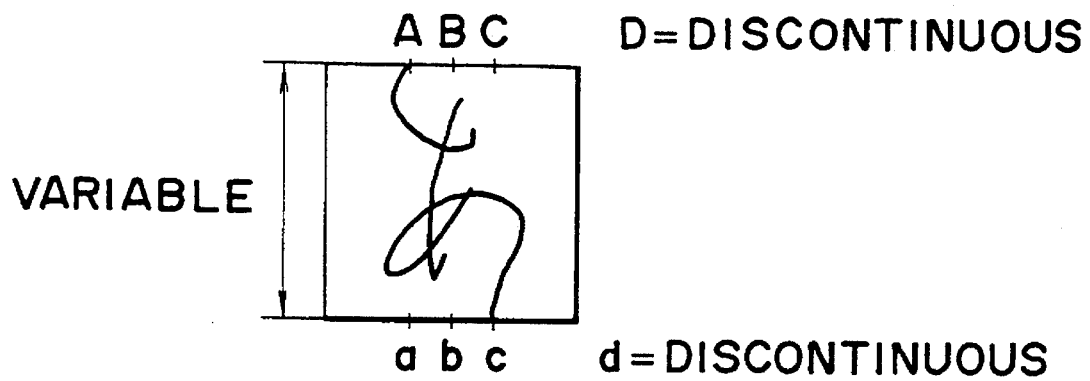
FIG. 3 is a diagram illustrating the writing start and end points of a character according to an embodiment of this invention.
Figure 4:
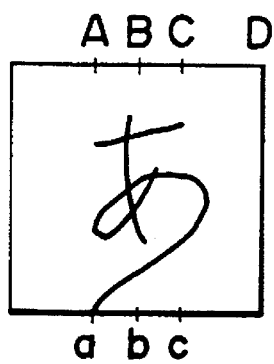
FIG. 4 is a diagram illustrating a character pattern in continuous script according to an embodiment of this invention.

For example, character "あ" ("a") shown in FIG. 3 has the writing start point A and end point c for continuous script.

By previously determining the writing end and start points of each character as described above, proper writing start and writing end patterns can be selected considering the connection between characters.

In this embodiment, therefore, 4×4=16 continuous-script font patterns are provided for each character at a maximum corresponding to combinations of writing start points and writing end points. Since a particular combination of the writing start and end points will result in an unnatural character style, the number of patterns provided for each character may become smaller than 16. FIG. 4 shows an example of a font pattern of a character image "あ". This font pattern is used when the preceding character has the writing end point d and the following character has the writing start point A which is coupled to the writing end point a of this font pattern.

Font patterns of each character, 16 patterns at a maximum, are previously stored in ROM 3 at the font data area 3-2. The address of the font data area 3-2 discriminated by a set of a character code, and writing start and end point codes. This address information of font patterns for characters are previously stored in ROM 3 at the directory area 3-1.

FIGS. 5-1 to 5-3 show examples of the contents of the directory area 3-1.

In FIG. 5-1, the information representative of the writing start and end points of a character "あ" ("a") is stored in areas 3-1A and 3-1B, respectively.

An address used for reading ROM 3 is discriminated by a set of a basic character code $X_n$ (n is the number of character code) inputted from the external apparatus, and writing start and end point codes. For instance, the character shown in FIG. 4 is accessed by an address discriminated by a set of a basic character code $X_n=2422$, and writing start and end point codes $S(N)$ and $E(N)$ corresponding to points D and a.

Figure 7A:
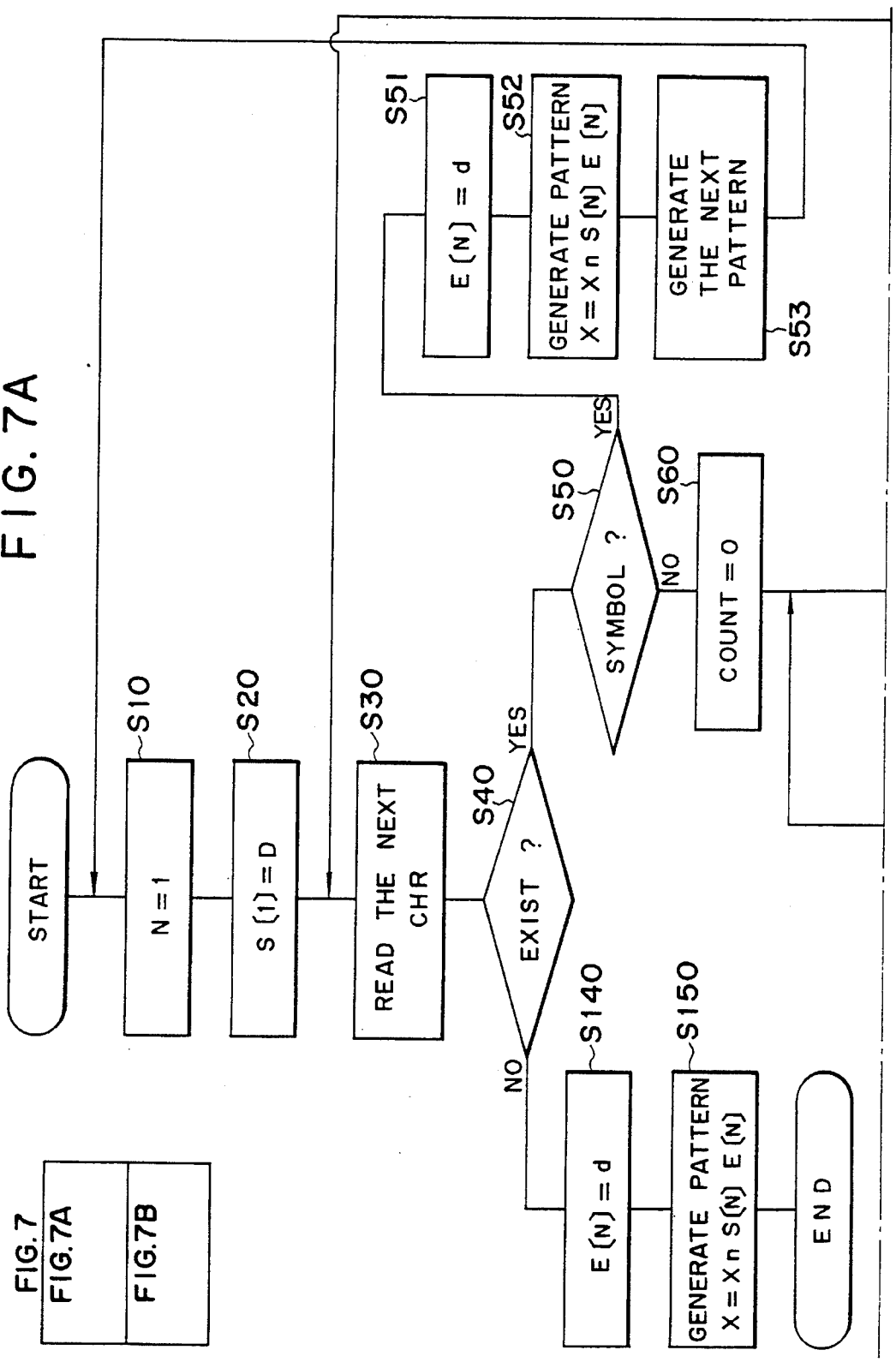
Figure 7B:
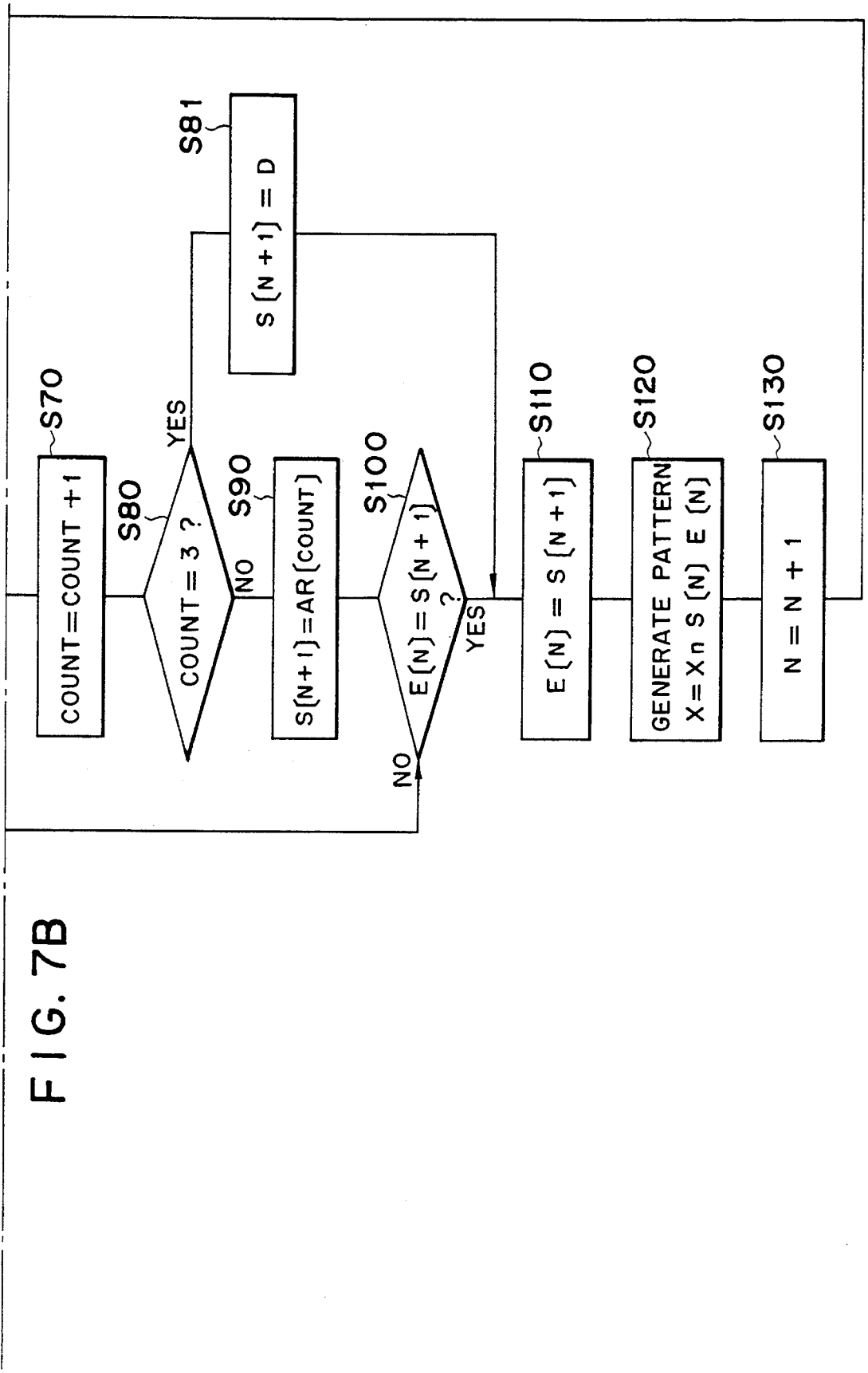

The operation of the circuit shown in FIG. 2 will be described next with reference to the flow chart shown in FIG. 7.

Character codes of the characters to be generated are sent from the external apparatus 4 and received by the input buffer 5. Assuming that character codes for character strings "あ" ("a"), "ふ" ("fu") and "し" ("shi") are received in the input buffer 5, CPU 2 then picks up the character code of the first character "あ" ("a") from the input buffer and starts the control procedure shown in FIG. 7.

In this flow chart, N represents the order of a character in a string of continuous characters, COUNT represents the contents of a counter, and AR(n) represents the writing start point of the next character in the order of priority.

At steps S10 and S20, the first character in the continuous character string is set as discontinuous from the preceding character. The next character is read (step S30). If there is no next character, the first character is set with the writing end point d, and the character pattern is sent to the output buffer 7 (steps S140 and S150) to terminate the control procedure. If there is the next character, the following control is executed starting from step S40.

It is checked if the next character is a symbol or not (step S50). If the next character is a symbol, the first character is judged as the last one in the continuous character string. Accordingly, the writing end point the first character is set as point d so that the character pattern discriminated by the character address code $X=X_nS(N)E(N)$ (i.e., $X=X_nS(N)d$) together with the next character pattern, i.e. symbol pattern is sent to the output buffer 7 (steps S51 to S53). If the next character is not a symbol, the most proper continuity between the first and second characters is determined at steps S60 to S110, and in accordance with this determination, a character pattern is selected and sent to the output buffer (step S120).

The most proper continuity is determined mainly from the writing start point of the next character. First, the writing start point, of the highest priority, of the next character is read from the information AR. Next, it is checked if there exists the writing end point of the first character matching the write start point of the second or next character (at step S100). If it is not present, the writing start point of the next character is changed to the second priority order, and the similar processes are repeated for such check (steps S70 to S100).

If there are no writing end point of the first character to be coupled to the writing start point of the second character, the writing end point of the first character and the writing start point of the second character are set as d and D, respectively (steps S81 and S110).

The above operations will be detailed further for the case of a continuous character string of "あ" ("a"), "ふ" ("fu") and "し" ("shi") with reference to FIGS. 5-1 to 5-3 and FIG. 10.

The writing start point of the first character "あ" ("a") is determined as D (step S20). Then, the writing start point of the next character "ふ" ("fu") is determined as B at step S90. Since the writing end point b of the character "あ" ("a") is present which matches the writing start point B or the second character (step S100), the writing start and end points of the first character "あ" ("a") are determined as Db. Next, in order to determine the writing end point of the character "ふ" ("fu"), the writing start point, of the highest priority, of the next character "し" ("shi") is checked (at step S90) which is B. In this case, the writing end point b of the character "ふ" ("fu") is not present which matches the writing start point B of the character "ｼ" ("shi") (step S100).

Accordingly, the writing start point of the character "ｼ" ("shi") is changed to the second highest priority, i.e., C (step S70). The writing end point c of the character "ﾌ" ("fu") is present which matches the writing start point C of the character "ｼ" ("shi") (step S100). Accordingly, the writing end point of the character "ﾌ" ("fu") and the writing start point of the character "ｼ" ("shi") are determined as c and C, respectively. The writing start and end points for the character "ﾌ" ("fu") is thereby determined as Bc. Next, the next character to the character "ｼ" ("fu") is checked. In this case, there is no next character (step S40) so that the writing end point of the character "ｼ" ("shi") is determined as d (step S140). The writing start and end points of the character "ｼ" ("shi") are thereby determined Cd. After a predetermined amount of font data is stored in the output buffer 7, the font data is transferred to the output apparatus 8 in response to a command from CPU 2.

Various applications of this invention may be contemplated. Examples are as follows:

(1) In the above embodiment, Japanese hiragana characters are used by way of example. This invention is also applicable to Japanese kanji characters, English characters and other characters, inclusive of double-sized characters.

(2) In the above embodiment, the number of writing start and end points are determined as each having four points. It is needless to say that the number of writing start and end points may be increased depending upon the font style of each character.

(3) In the above embodiment, the most proper continuity between two characters is mainly determined from the writing start point of the next character. The continuity may be determined mainly from the writing end point of the first character.

Figure 11:
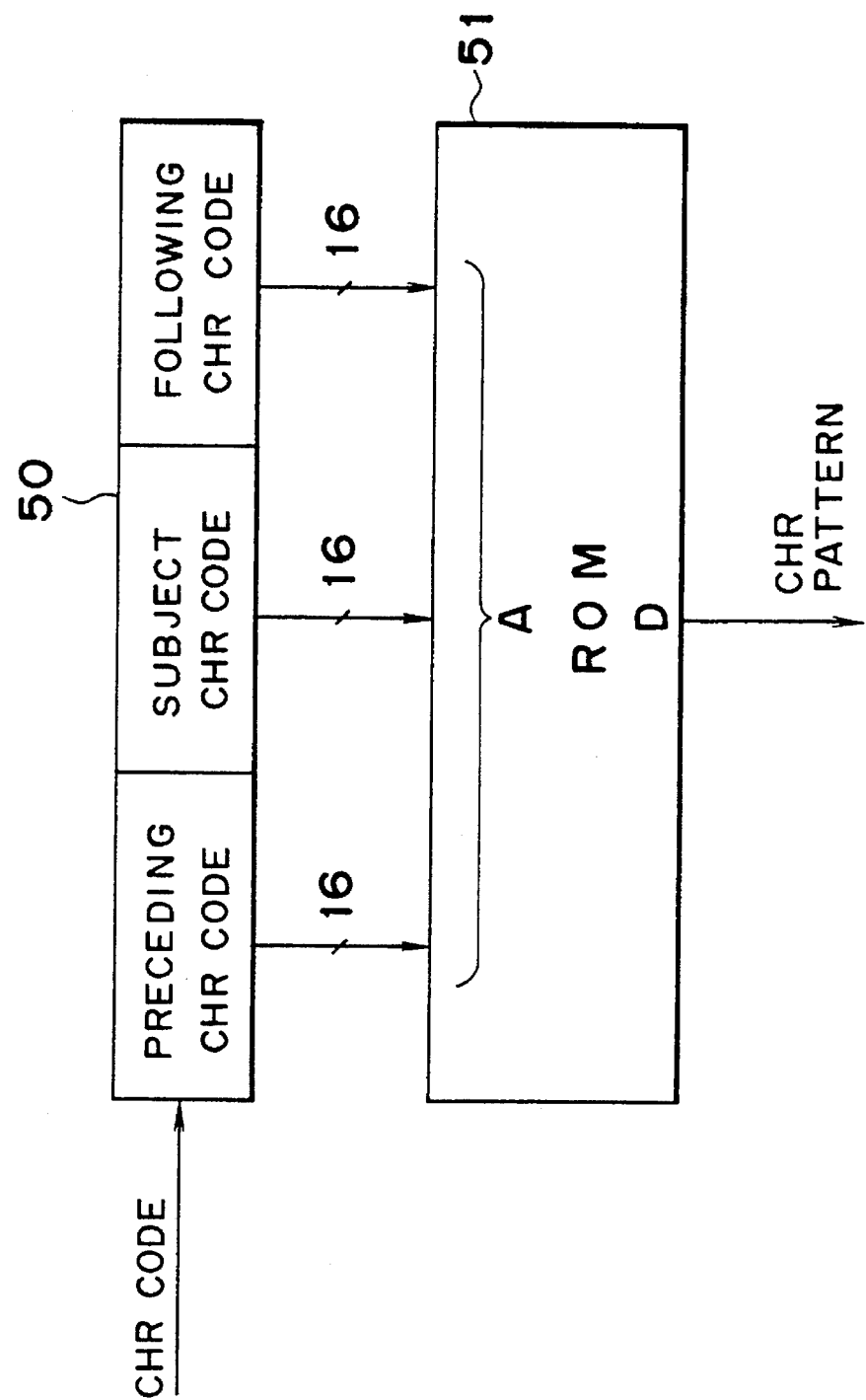
FIG. 11 is a block diagram showing the circuit structure according to a second embodiment of this invention.

(4) In the above embodiment, a character pattern is selected while referring to the table or ROM 3. A character pattern can be definitely selected in accordance with the preceding and following characters in a string of continuous characters. For this reason, it is also possible to select a character pattern by using character codes of a subject character and preceding and following characters. In such a case, as shown in FIG. 11, a shift register 50 is connected to the character generator constructed of a ROM 51. This shift register 50 stores the subject character code, and codes of the preceding and following characters (inclusive of symbol and blank). The stored codes are used as an address for accessing ROM 51.

A character pattern coupled to the preceding and following character patterns is previously stored in ROM 51 at the address identified by the three character codes from the shift register 50.

As a string of continuous characters which follows a start blank character code is inputted sequentially to the shift register 50, character pattern are sequentially outputted from the data line of ROM 51.

Although the memory capacity of ROM 51 becomes considerably large as compared with the first embodiment, the process speed is advantageously high.

As appreciated from the foregoing description of the present invention, a most proper character pattern can be selected by search means. It becomes possible to generate a character pattern in a string of continuous characters, which has not been allowed in a conventional character generator, thus providing a further variation of character styles of a character image to be outputted.

I claim:

1. A character generator comprising:
   storage means for storing a plurality of continuous-script character patterns for each character having a specified character code, the plurality of character patterns having different writing start and end points so as to continuously couple a character pattern to preceding and following character patterns when these characters are outputted; and
   searching means for searching the plurality of character patterns stored in said storage means for a most appropriate character pattern corresponding to a subject character code, wherein the most appropriate character pattern is determined by determining the writing end point thereof on the basis of the writing start point of a following character pattern such that the most appropriate character pattern is continuously coupled to the following character pattern.

2. A character generator according to claim 1, wherein said character generator is used for Japanese characters.

3. A character generator according to claim 1, wherein said character generator is used for at least one of printing and displaying character patterns.

4. A method of character generation using a plurality of stored continuous-script character patterns for each character having a specified character code, the plurality of character patterns having different writing start and end points so as to continuously couple a character pattern to preceding and following character patterns when these characters are outputted, said method comprising the steps of:
   determining the writing end point of a most appropriate character pattern corresponding to a subject character code on the basis of the writing start point of a following character pattern such that the most appropriate character pattern is continuously coupled to the following character pattern; and
   searching the plurality of stored character patterns for the most appropriate character pattern determined in said determining step.

5. A method of character generation according to claim 4, wherein Japanese characters are generated.

6. A method of character generation according to claim 4, further comprising the step of printing character patterns.

7. A method of character generation according to claim 4, further comprising the step of displaying character patterns.

8. An information processing apparatus comprising:
   input means for inputting character codes;
   memory means for sequentially storing the character codes input by said input means;
   pattern memory means for storing a plurality of character patterns for one character code, the plurality of character patterns having respective different start and end points;
   output means for outputting a character pattern; and
   control means for converting each character code stored in said memory means into a corresponding character pattern, and for sending the corresponding character pattern to said output means, wherein said control means sets an end point of a character pattern corresponding to one of consecutive character codes based on a start point of a character pattern corresponding to a subsequent one of the consecutive character codes, and reads a suitable character pattern stored in said pattern memory means.

9. An apparatus according to claim 8, wherein each of the character patterns stored in said pattern memory means corresponds to a code comprising a character code, a start position code and an end position code.

10. An apparatus according to claim 9, wherein said pattern memory means further stores a character pattern which is not connected to at least one of preceding and subsequent character patterns.

11. An apparatus according to claim 9, wherein said control means converts the input character code into a code comprising a character code, a start position code and an end position code and reads the suitable character pattern from said pattern memory means based on the converted code.

12. An apparatus according to claim 9, wherein the start position and the end position are represented by coordinate positions.

13. An apparatus according to claim 9, wherein the start position and the end position are represented by positions of a dot pattern outermost of the character pattern.

14. An information processing method of outputting a character pattern corresponding to an input character code, said method comprising the steps of:

sequentially storing input character codes in a memory;

setting an end point of a character pattern corresponding to one of consecutive character codes stored in the memory based on a start point of a character pattern corresponding to a subsequent character code of the consecutive character codes;

reading a suitable character pattern from a pattern memory, which stores a plurality of character patterns for each character code, the plurality of character patterns having respective different start and end points, based on the set start and end points; and sending the read character pattern to an output means.

15. A method according to claim 14, wherein each of the character patterns stored in the pattern memory corresponds to a code comprising a character code, a start position code and an end position code.

16. A method according to claim 15, wherein the pattern memory further stores a character pattern which is not connected to at least one of preceding and subsequent patterns.

17. A method according to claim 15, wherein said reading step comprises a step of converting the input character code into a code comprising a character code, a start position code and an end position code and a step of reading the suitable character pattern from the pattern memory based on the converted code.

18. A method according to claim 15, wherein the start position and the end position are represented by coordinate positions.

19. A method according to claim 15, wherein the start position and the end position are represented by positions of a dot pattern outermost of the character pattern.

* * * * *

UNITED STATES PATENT AND TRADEMARK OFFICE
CERTIFICATE OF CORRECTION

PATENT NO. : 5,481,277  
DATED : January 2, 1996  
INVENTOR(S) : HIDEHIKO MORINAGA Page 1 of 3

It is certified that error appears in the above-indentified patent and that said Letters Patent is hereby corrected as shown below:

ON THE COVER PAGE

Item: [56] References Cited

U.S. PATENT DOCUMENTS

Insert --4,604,712  8/1986  Orrhammar  
4,670,842  6/1987  Metwaly--.

FOREIGN PATENT DOCUMENTS

Insert --0120481  10/1984  European Pat. Off.  
59-230754  12/1984  Japan  
62-282381  12/1987  Japan  
2208556  4/1989  United Kingdom--.

OTHER PUBLICATIONS

Insert --IBM Technical Disclosure Bulletin, Vol. 30, No. 10, March 1988, pp. 139-41.--.

COLUMN 2

Line 55, "are" should read --is--.

COLUMN 3

Line 47, "discriminated" should read --is discriminated--.  
Line 49, "are" should read --is--.

UNITED STATES PATENT AND TRADEMARK OFFICE
CERTIFICATE OF CORRECTION

PATENT NO. : 5,481,277     Page 2 of 3

DATED :

INVENTOR(S) : January 2, 1996

HIDEHIKO MORINAGA

It is certified that error appears in the above-indentified patent and that said Letters Patent is hereby corrected as shown below:

COLUMN 4

Line 4, ""ふ" ("fu") and "ち" ("shi")" should read --"ふ" ("fu") and "し" ("shi")--;
    Line 44, "are" should read --is--;
    Line 51, ""ち" ("fu")" should read --"ふ," ("fu")--;
    Line 52, ""z,3" ("shi")" should read --"し" ("shi")--;
    Line 56, ""ち" ("fu")" should read --"ふ," ("fu")--;
    Line 62, """ should be deleted;
    Line 64, "ち" ("fu")" should read --"ふ," ("fu")--;
    Line 65, ""ち" ("shi")" should read --"し" ("shi")--; and
    Line 67, ""ち" ("fu")" should read --"ふ," ("fu")--.

COLUMN 5

Line 1, ""ち" ("shi")" should read --"し" ("shi")--;
    Line 3, ""ち"" should read --"し"--;
    Line 5, ""ち" ("fu")" should read --"ふ," ("fu")--;
    Line 7, ""ち" ("shi")" should read --"し" ("shi")--;
    Line 9, ""ち" ("fu")" should read --"ふ," ("fu")--;
    Line 10, ""ち" ("shi")" should read --"し" ("shi")--;
    Line 12, ""ち" ("fu")" should read --"ふ," ("fu")--;
    Line 14, ""ち" ("fu")" should read --"ふ," ("fu")--;
    Line 16, ""ち" ("shi")" should read --"し" ("shi")--;

UNITED STATES PATENT AND TRADEMARK OFFICE
CERTIFICATE OF CORRECTION

PATENT NO. : 5,481,277

DATED : January 2, 1996

INVENTOR(S) : HIDEHIKO MORINAGA

It is certified that error appears in the above-indentified patent and that said Letters Patent is hereby corrected as shown below:

COLUMN 5

Line 18, ""る" ("shi")" should read --"し" ("shi")--;
Line 30, "are" should read --is--; and
Line 56, "pattern" should read --patterns--.

Signed and Sealed this

Sixteenth Day of July, 1996

Attest:

BRUCE LEHMAN

*Attesting Officer*  *Commissioner of Patents and Trademarks*